United States Patent
Kobayashi et al.

(10) Patent No.: US 8,320,111 B2
(45) Date of Patent: Nov. 27, 2012

(54) SLIDE/ROTATION ATTACHMENT UNIT AND ELECTRONIC DEVICE USING THE SAME

(75) Inventors: Fumiyuki Kobayashi, Tokyo (JP); Oh Tanaka, Tokyo (JP)

(73) Assignees: NEC Corporation, Tokyo (JP); Yamamoto Precision Co., Ltd., Tokyo (JP); Techno Associe Co., Ltd., Osaka (JP)

( * ) Notice: Subject to any disclaimer, the term of this patent is extended or adjusted under 35 U.S.C. 154(b) by 252 days.

(21) Appl. No.: 12/935,502

(22) PCT Filed: Mar. 25, 2009

(86) PCT No.: PCT/JP2009/056775
§ 371 (c)(1),
(2), (4) Date: Sep. 29, 2010

(87) PCT Pub. No.: WO2009/123250
PCT Pub. Date: Oct. 8, 2009

(65) Prior Publication Data
US 2011/0032667 A1 Feb. 10, 2011

(30) Foreign Application Priority Data

Mar. 31, 2008 (JP) ................. 2008-093851
Jul. 28, 2008 (JP) ................. 2008-193221

(51) Int. Cl.
*G06F 1/16* (2006.01)
(52) U.S. Cl. ............. 361/679.1; 312/326; 206/456; 248/526
(58) Field of Classification Search ............. 312/249.11, 312/24, 22, 326, 218; 206/457, 710, 456, 206/586, 701; 361/679.01, 679.41, 679.57, 361/679.42, 679.32, 679.33, 699, 715, 799, 361/800; 165/80.2; 248/62, 72, 161, 121, 248/526, 429; 16/258, 242, 233; 360/99.06, 360/99.16, 99, 133
See application file for complete search history.

(56) References Cited

U.S. PATENT DOCUMENTS

| | | | | |
|---|---|---|---|---|
| 5,243,856 A | * | 9/1993 | Yamazaki et al. | 74/538 |
| 5,587,856 A | * | 12/1996 | Aoyama | 360/99.02 |
| 2003/0114198 A1 | | 6/2003 | Han | |
| 2004/0137940 A1 | | 7/2004 | Matsunami | |
| 2005/0104384 A1 | * | 5/2005 | Kondo et al. | 292/240 |
| 2012/0091734 A1 | * | 4/2012 | Schendel et al. | 292/126 |

FOREIGN PATENT DOCUMENTS

| | | |
|---|---|---|
| JP | 2003-198690 A | 7/2003 |
| JP | 2004-215180 A | 7/2004 |
| JP | 2006-019925 A | 1/2006 |

* cited by examiner

*Primary Examiner* — Hung Duong
(74) *Attorney, Agent, or Firm* — Sughrue Mion, PLLC

(57) ABSTRACT

In a slide/rotation attachment unit (100) having a base plate (1) with first and second axis pins (10, 10a) being spaced from each other at a predetermined distance and a movable plate (2) with first and second hook-shaped portions (20, 20a) that can engage with the first and second axis pins, respectively, the base plate and the movable plate are joined together so that the base plate and the movable plate are rotatable relative to each other. When the movable plate rotates in one direction, the first hook-shaped portion is brought into engagement with the first axis pin, and the second hook-shaped portion is disengaged from the second axis pin. When the movable plate rotates in another direction, the second hook-shaped portion is brought into engagement with the second axis pin, and the first hook-shaped portion is disengaged from the first axis pin.

13 Claims, 14 Drawing Sheets

SLIDE/ROTATION ATTACHMENT UNIT AND ELECTRONIC DEVICE USING THE SAME

CROSS REFERENCE TO RELATED APPLICATIONS

This application is a National Stage of International Application No. PCT/JP2009/056775, filed on Mar. 25, 2009, which claims priority from Japanese Patent Application Nos. 2008-093851 and 2008-193221, filed on Mar. 31, 2008 and Jul. 28, 2008 respectively, the contents of all of which are incorporated herein by reference in their entirety.

TECHNICAL FIELD

The present invention relates to a slide/rotation attachment unit for attaching a display unit having a display part to an operation unit having an operation part so that the display unit is slidable and rotatable with respect to the operation unit (including not only attaching the display unit directly to the operation unit, but also attaching the display unit indirectly to the operation unit via another independent member) and an electronic device using the same, such as a cellular phone, a PDA (Personal Digital Assistant), or a notebook computer.

BACKGROUND ART

In an electronic device such as a cellular phone, a PDA, or a notebook computer, a display unit is coupled to an operation unit in a foldable manner via a hinged portion, or a display unit is coupled to a vertically-oriented operation unit so that the display unit is slidable relative to the operation unit along a longitudinal direction in a state in which the display unit is overlaid on the operation unit. In most cases, the display unit has a vertically-oriented shape or a horizontally-oriented shape. Therefore, if the display unit is fixed in position, the usability is problematically impaired for a variety of different uses.

Japanese laid-open patent publication No. 2006-019925 has proposed a personal digital assistant having a rotation coupling mechanism for coupling a display unit to a vertically-oriented operation unit so that the display unit is slidable and rotatable relative to the operation unit. The rotation coupling mechanism is configured to use a rotational operation to change between a close state in which the display unit covers an operation part of the operation unit and an open state in which the operation part of the operation unit is exposed.

Furthermore, Japanese laid-open patent publication No. 2004-215180 has proposed a portable wireless terminal device in which a vertically-oriented operation unit and a vertically-oriented display unit are coupled to each other in a foldable manner by a coupling mechanism including a hinged portion and a slide rotation portion. The portable wireless terminal device is usually used along with an open/close operation using the hinged portion. The display unit is rotated through 90 degrees by the slide rotation portion as needed. Thus, the display unit can be changed between a vertically-oriented posture and a horizontally-oriented posture.

DISCLOSURE OF THE INVENTION

Problem(s) to be Solved by the Invention

In the case of Japanese laid-open patent publication No. 2006-019925, the vertically-oriented display unit only changes from an overlaid state in which the display unit is overlaid on a front of the similarly oriented operation unit into the horizontally-oriented display posture or, conversely, from the horizontally-oriented display posture into the vertically-oriented posture in which the display unit is overlaid on the operation unit. Therefore, the operation part of the operation unit is exposed only when the display unit has been changed to the horizontally-oriented posture. The operation part of the operation unit is always covered and shielded with the display unit when the display unit takes the vertically-oriented posture. Rather, the usability is impaired in some cases.

On the other hand, in the case of Japanese laid-open patent publication No. 2004-215180, an operation of sliding the display unit after rotating the display unit is required to change the display unit from the vertically-oriented posture to the horizontally-oriented posture. Furthermore, an operation in inverse order to the aforementioned operation is required to change the display unit from the horizontally-oriented posture to the vertically-oriented posture. Thus, troublesome operations are required for postural change, and the usability is impaired.

It is therefore an object of the present invention to provide a slide/rotation attachment unit capable of achieving a variety of postural changes.

Another object of the present invention is to provide an electronic device that can take a variety of display postures and can enhance usability.

Means to Solve the Problem(s)

A slide/rotation attachment unit according to the present invention includes a base plate with first and second axis pins being spaced from each other at a predetermined distance and a movable plate with first and second hook-shaped portions that can engage with the first and second axis pins, respectively, and the base plate and the movable plate are joined together so that the base plate and the movable plate are rotatable relative to each other. The slide/rotation attachment unit is characterized in that, when the movable plate rotates in one direction, the first hook-shaped portion is brought into engagement with the first axis pin and the second hook-shaped portion is disengaged from the second axis pin, and, when the movable plate rotates in another direction, the second hook-shaped portion is brought into engagement with the second axis pin and the first hook-shaped portion is disengaged from the first axis pin.

A first electronic device according to the present invention is characterized in that the aforementioned slide/rotation attachment unit is provided between a first unit as an operation unit and a second unit as a display unit in a state in which a rear surface of the second unit is overlaid on a front surface of the first unit, the base plate is attached to the first unit, the movable plate is attached to the second unit, the first hook-shaped portion of the movable plate engages with the first axis pin in the attached state while the second hook-shaped portion is disengaged from the second axis pin, the second hook-shaped portion is brought into engagement with the second axis pin and the second unit is changed from a vertically-oriented posture to a horizontally-oriented posture when the movable plate rotates about the first axis pin through 90 degrees toward the second axis pin, and the second unit is changed into a vertically-oriented posture in which part of the second unit is overlaid on part of the first unit along a longitudinal direction when the movable plate further rotates about the second axis pin through 90 degrees in the same direction.

A second electronic device according to the present invention is a slidable electronic device in which a first unit as an operation unit is slidable relative to a second unit as a display unit in a state in which a rear surface of the second unit is overlaid on a front surface of the first unit. The slidable electronic device is characterized in that the aforementioned slide/rotation attachment unit is provided between the first unit and the second unit, the base plate is attached to the first unit, the movable plate is attached to the second unit, the first and second hook-shaped portions of the movable plate engage with the first and second axis pins of the base plate, respectively, in the attached state, the second unit is changed from a vertically-oriented posture to a horizontally-oriented posture when the movable plate rotates about the first axis pin through 90 degrees in one direction, and the second unit is changed into a reversed horizontally-oriented posture when the movable plate rotates about the second axis pin through 90 degrees in another direction.

A third electronic device according to the present invention is a foldable electronic device in which a first unit as an operation unit is coupled to a second unit as a display unit in a foldable manner. The foldable electronic device is characterized in that the first unit includes a holding base coupled via a foldable hinged portion, the second unit is coupled to the first unit via the holding base, the aforementioned slide/rotation attachment unit is provided between the first unit and the second unit, the base plate is attached to the holding base, the movable plate is attached to the second unit, the first and second hook-shaped portions of the movable plate engage with the first and second axis pins of the base plate, respectively, in the attached state, the second unit is changed from a vertically-oriented posture to a horizontally-oriented posture when the movable plate rotates about the first axis pin through 90 degrees in one direction, and the second unit is changed into a reversed horizontally-oriented posture when the movable plate rotates about the second axis pin through 90 degrees in another direction.

Effects(s) of the Invention

According to the slide/rotation attachment unit of the present invention, a variety of postural changes can be achieved.

According to the first electronic device of the present invention, when the second unit to which the movable plate is attached is rotated about the first axis pin toward the second axis pin through 90 degrees, the second hook-shaped portion of the movable plate is brought into engagement with the second axis pin. Therefore, the display posture of the second unit is changed into a horizontally-oriented posture. When the second unit is further rotated through 90 degrees in the same direction, the second unit is positioned into one end of the first unit, and another end of the first unit is changed into a vertically-oriented posture. Therefore, the display postures of the second unit can be changed in more various manners, and it is possible to provide a cellular phone having enhanced usability.

According to each of the second and third electronic devices of the present invention, when the second unit to which the movable plate is attached is rotated about the first axis pin through 90 degrees in one direction, the display posture of the second unit is changed from a vertically-oriented posture to a horizontally-oriented posture. When the second unit is rotated about the second axis pin through 90 degrees in another direction, the display posture of the second unit is changed into a reversed horizontally-oriented posture. Therefore, the display postures of the second unit can be changed in more various manners, and it is possible to provide a cellular phone having enhanced usability.

EXEMPLARY EMBODIMENTS OF THE INVENTION (Slide/Rotation Attachment Unit)

Figure 1:
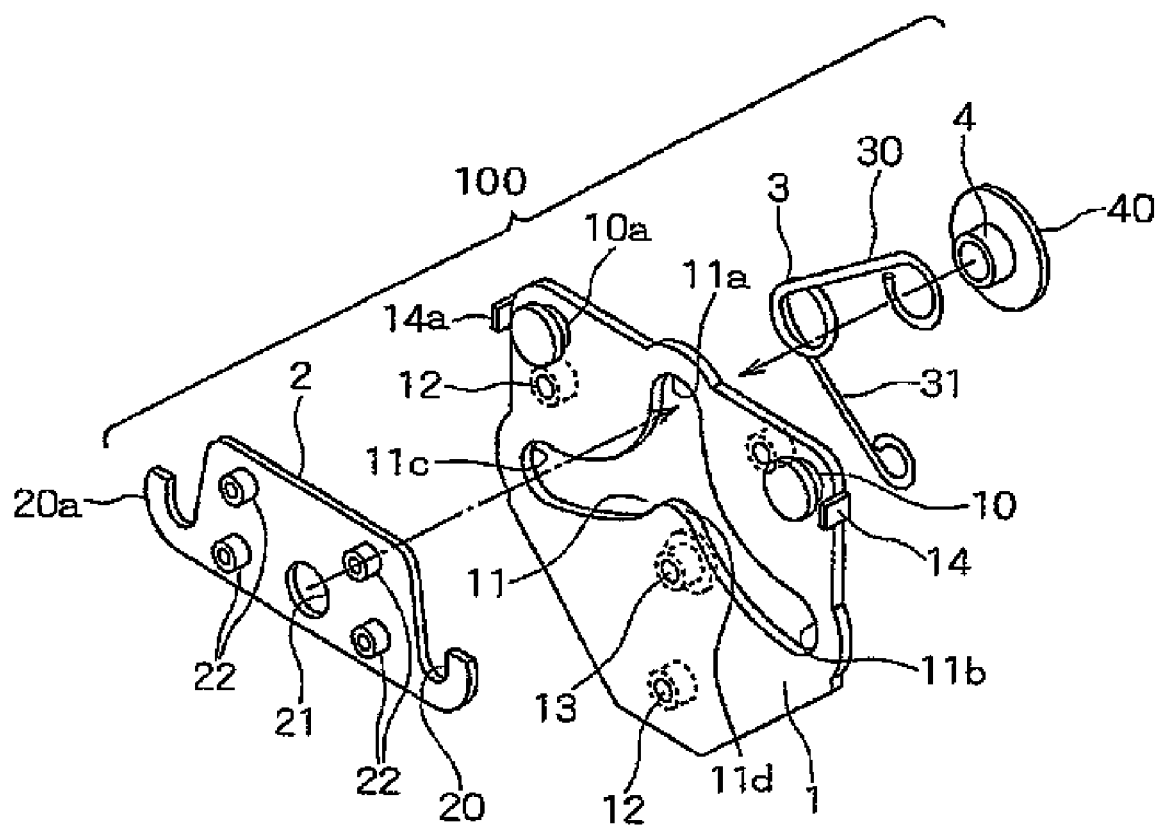
FIG. 1 is a partially exploded perspective view of a slide/rotation attachment unit according to an embodiment of the present invention.
Figure 2:
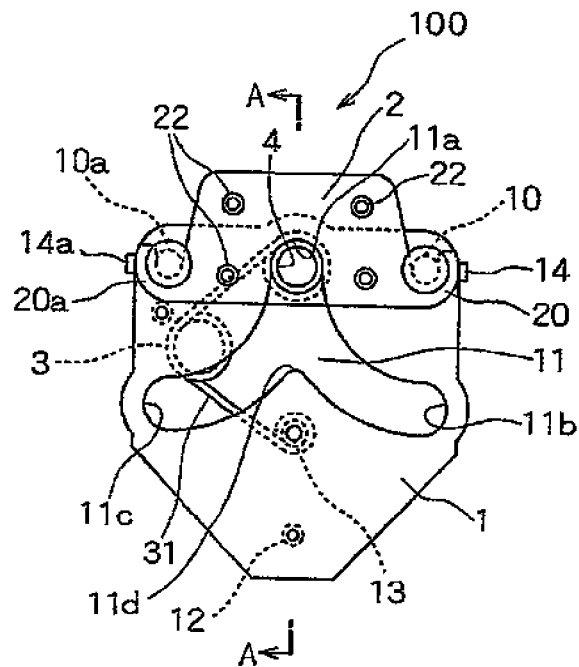
FIG. 2 is a front view of a state in which a movable plate of the slide/rotation attachment unit of FIG. 1 takes one of standard postures.
Figure 3:
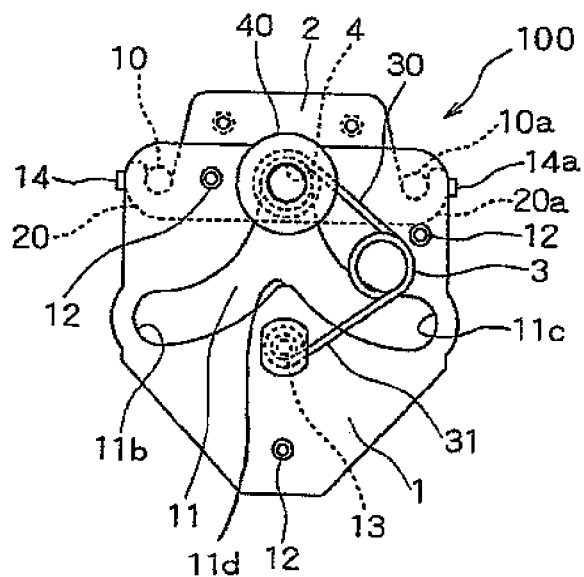
FIG. 3 is a rear view of the unit of FIG. 2.
Figure 4:
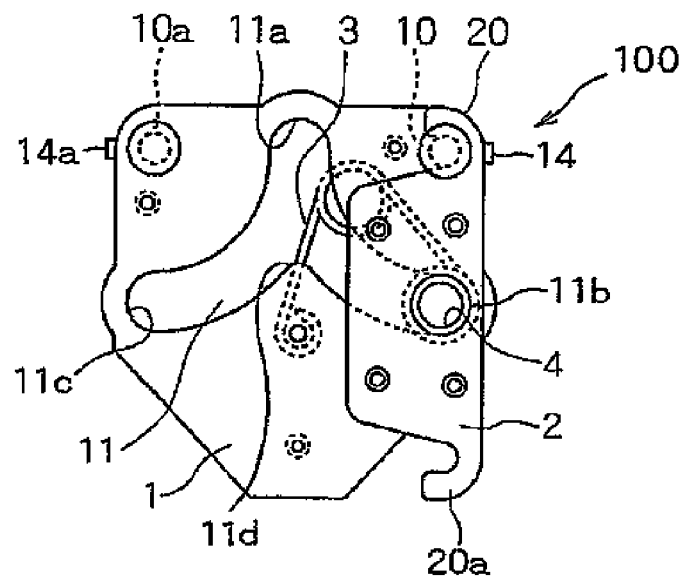
FIG. 4 is a front view of a state in which the movable plate of the slide/rotation attachment unit has rotated through 90 degrees in one direction from the state of FIG. 2.
Figure 5:
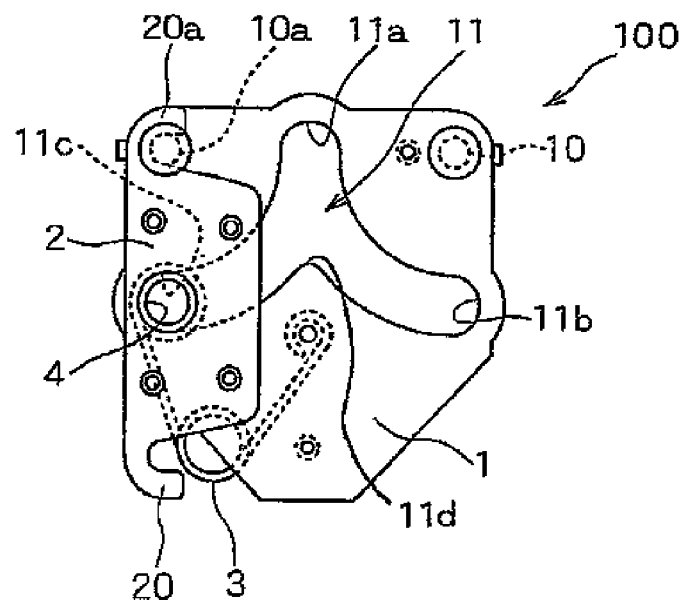
FIG. 5 is a front view of a state in which the movable plate of the slide/rotation attachment unit has rotated through 90 degrees in another direction from the state of FIG. 2.
Figure 6:
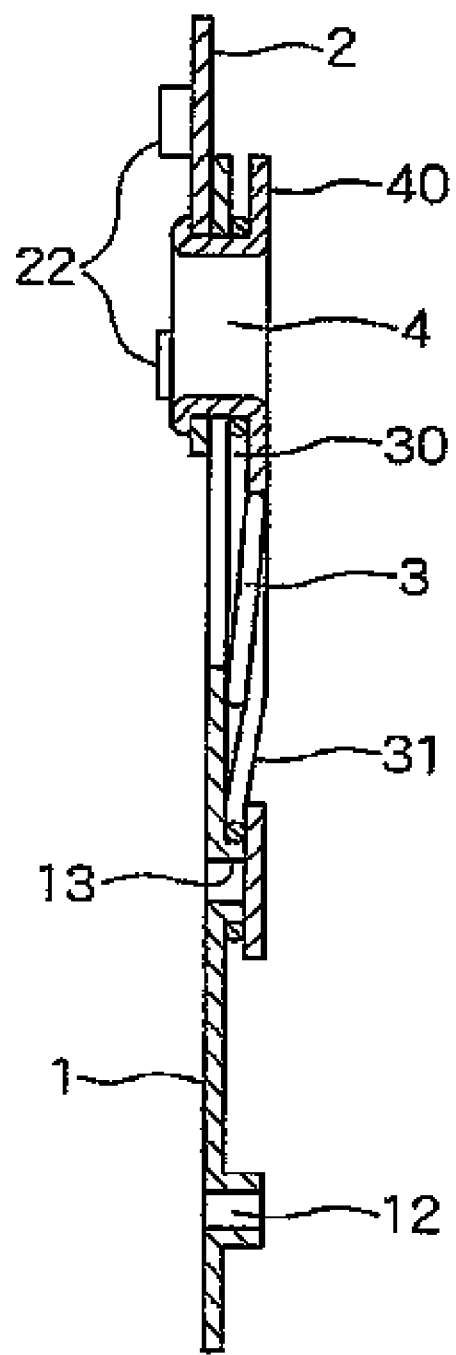
FIG. 6 is an enlarged cross-sectional view taken along arrow A-A of FIG. 2.

FIG. 1 is a partially exploded perspective view of a slide/rotation attachment unit according to an embodiment of the present invention, FIG. 2 a front view of a state in which a movable plate of the slide/rotation attachment unit of FIG. 1 takes one of standard postures, FIG. 3 is a rear view of that state, FIG. 4 a front view of a state in which the movable plate of the slide/rotation attachment unit has rotated through 90 degrees in one direction from the state of FIG. 2, FIG. 5 a front view of a state in which the movable plate of the slide/rotation attachment unit has rotated through 90 degrees in another direction from the state of FIG. 2, and FIG. 6 an enlarged cross-sectional view taken along arrow A-A of FIG. 2.

A slide/rotation attachment unit 100 shown in FIGS. 1 to 6 includes a base plate 1 having first and second axis pins 10 and 10a spaced from each other at a predetermined distance and a movable plate 2 having first and second hook-shaped portions 20 and 20a that can engage with the first and second axis pins 10 and 10a, respectively. The base plate 1 and the movable plate 2 are joined together so that they are pivotable (rotatable) relative to each other. The movable plate 2 is configured such that the first hook-shaped portion 20 is brought into engagement with the first axis pin 10 while the second hook-shaped portion 20a is disengaged from the second axis pin 10a when the movable plate 2 rotates in one direction and is also configured such that the second hook-shaped portion 20a is brought into engagement with the second axis pin 10a while the first hook-shaped portion 20 is disengaged from the first axis pin 10 when the movable plate 2 rotates in another direction.

The slide/rotation attachment unit 100 further includes an attachment shaft 4, with which the base plate 1 and the movable plate 2 are joined together. The base plate 1 has a guide slit 11 having such a shape that an arc with a center at the first axis pin 10 and an arc with a center at the second axis pin 10a meet at an intermediate position between the first and second axis pins 10 and 10a. Meanwhile, the movable plate 2 has an attachment portion 21 of a circular hole formed at an intermediate position between the first and second hook-shaped portions 20 and 20a. The attachment shaft 4 is fixed to the attachment portion 21 and is configured to be slidable within the guide slit 11 in a state in which the attachment shaft 4 is prevented from coming off.

The intermediate position between the first and second axis pins 10 and 10a is a substantial midpoint of a line connecting the first and second axis pins 10 and 10a. The intermediate position between the first and second hook-shaped portions 20 and 20a is a substantial midpoint of a line connecting the first and second hook-shaped portions 20 and 20a. The intermediate position between the first and second axis pins 10 and 10a may not necessarily be a substantial midpoint of a line and may be an intermediate point that is equidistant from both of the axis pins 10 and 10a.

A spring 3 is provided for biasing actuation of the movable plate 2 and for regulating actuation of the movable plate 2 along with the guide slit 11 and the attachment shaft 4, which is slidable along the guide slit 11. The guide slit 11 includes the following first to third recessed portions 11a to 11c.

The first recessed portion 11a is located at a first end of the arc with its center at the axis pin 10 and also at a first end of the arc with its center at the axis pin 10a. As shown in FIGS. 2 and 3, the attachment shaft 4 is guided into the first recessed portion 11 a by a biasing force of the spring 3 when the first and second hook-shaped portions 20 and 20a of the movable plate 2 engage with the first and second axis pins 10 and 10a, respectively.

The second recessed portion 11b is located at a second end of the arc with its center at the axis pin 10. As shown in FIG. 4, the attachment shaft 4 is guided into the second recessed portion 11b by a biasing force of the spring 3 when the movable plate 2 rotates about the first axis pin 10 through 90 degrees in a first direction (counterclockwise as viewed from the front side of the slide/rotation attachment unit 100 in this embodiment) from a state in which the hook-shaped portions 20 and 20a have engaged with the corresponding axis pins 10 and 10a, respectively.

The third recessed portion 11c is located at a second end of the arc with its center at the axis pin 10a. As shown in FIG. 5, the attachment shaft 4 is guided into the third recessed portion 11c by a biasing force of the spring 3 when the movable plate 2 rotates about the second axis pin 10a through 90 degrees in a second direction from a state in which the hook-shaped portions 20 and 20a have been guided in the corresponding axis pins 10 and 10a, respectively.

When the movable plate 2 rotates about the first axis pin 10 in the first direction in the state in which the hook-shaped portions 20 and 20a of the movable plate 2 have engaged with the corresponding axis pins 10 and 10a (FIGS. 2 and 3), respectively, the second hook-shaped portion 20a is disengaged from the second axis pin 10a as shown in FIG. 4.

Furthermore, when the movable plate 2 rotates about the second axis pin 10a in the second direction in the state in which the hook-shaped portions 20 and 20a of the movable plate 2 have engaged with the corresponding axis pins 10 and 10a, respectively, the first hook-shaped portion 20 is disengaged from the first axis pin 10 as shown in FIG. 5.

The base plate 1 is produced by pressing a metal plate such as a stainless plate. The base plate 1 has a plurality of bossed nut portions 12 projecting at a rear side of the base plate 1 for attaching the base plate 1 to a first unit 6 or a holding base 5 (see figures following FIG. 13), which will be described later, by small screws.

The movable plate 2 is also produced by pressing a metal plate such as a stainless plate. The movable plate 2 has a plurality of bossed nut portions 22 projecting at a front side of the movable plate 2 for attaching the movable plate 2 to a display unit 7, which will be described later, by the same means as described above.

For example, it is preferable to form the guide slit 11 into a shape like a Japanese letter "く" in which two quarter arcs are combined on both sides of the first recessed portion 11a. More specifically, the guide slit 11 is formed into a shape in which the arc with its center at the first axis pin 10 and the arc with its center at the second axis pin 10a meet at an intermediate position between the two axis pins 10 and 10a (i.e., the recessed portion 11a).

In the guide slit 11, while a first inside surface of a portion at which the arcs meet at the intermediate position forms the recessed portion 11a as described above, a second inside surface forms a protruded portion 11d. The guide slit 11 is not limited to a slit having the aforementioned shape as long as the radius of each arc is smaller than a distance between the two axis pins 10 and 10*a*.

In the aforementioned slide/rotation attachment unit 100, the spring 3 uses a torsion spring. A curled portion of a movable arm 30 of the spring 3 is engaged with the attachment shaft 4, and a curled portion of a stationary arm 31 of the spring 3 is engaged with or fitted into a flanged shaft portion 13, which has integrally been produced on a rear side of the base plate 1 by press molding. The attachment shaft 4 has a flanged portion 40 formed on an end thereof. The attachment shaft 4 is short and hollow (like a pipe). A shaft portion of the attachment shaft 4 is passed through the curled portion of the movable arm 30 of the spring 3, and a shaft end of the attachment shaft 4 is caulked to the attachment portion 21, which is formed at an intermediate portion between the hook-shaped portions 20 and 20*a* of the movable plate 2.

The base plate 1 has regulation pieces 14 and 14*a* formed for regulating movement of the movable plate 2 without inhibiting the hook-shaped portions 20 and 20*a* from being disengaged from the corresponding axis pins 10 and 10*a* in the state in which the hook-shaped portions 20 and 20*a* of the movable plate 2 have engaged with the corresponding axis pins 10 and 10*a*.

Specifically, in order to prevent the hook-shaped portions 20 and 20*a* of the movable plate 2 from coming off, the regulation pieces 14 and 14*a* are configured to be longer than a movable length of the attachment shaft 4 as a joint portion when the attachment shaft 4 (the movable plate 2) is moved toward the protruded portion 11*d* of the guide slit 11 (in a downward direction of FIG. 3) in a state in which the attachment shaft 4 (the movable plate 2) has been guided in the recessed portion 11*a*, i.e., in a state in which the hook-shaped portions 20 and 20*a* have engaged with the corresponding axis pins 10 and 10*a* (FIG. 3), until the attachment shaft 4 is brought into contact with the protruded portion 11*d* of the guide slit 11.

A distance between the (paired) first and second axis pins 10 and 10*a* of the base plate 1 is equal to a distance between the centers of the first and second hook-shaped portions 20 and 20*a* of the movable plate 2. Since the attachment shaft 4 on the rear surface of the movable plate 2 is located at the intermediate position between the hook-shaped portions 20 and 20*a*, the center of the first recessed portion 11*a* of the guide slit 11 is located at the intermediate point between the pair of the axis pins 10 and 10*a*.

Distances between the axis pins 10 and 10*a* and the first recessed portion 11*a*, a distance between the first axis pin 10 and the second recessed portion 11*b*, and a distance between the second axis pin 10*a* and the third recessed portion 11*c* are equal to each other. Distances between the first recessed portion 11*a* and the second and third recessed portions 11*b* and 11*c* are equal to each other.

Therefore, the movable plate 2 can be rotated about the first axis pin 10 in a direction in which the second hook-shaped portion 20*a* is disengaged from the second axis pin 10*a* (counterclockwise in FIG. 2) from the state of FIGS. 2 and 3, in which the hook-shaped portions 20 and 20*a* of the movable plate 2 have engaged with the corresponding axis pins 10 and 10*a* of the base plate 1. Furthermore, the movable plate 2 can be rotated in a reverse direction from the state of FIG. 2.

When the movable plate 2 is rotated counterclockwise from the state of FIG. 2, the attachment shaft 4 slides along the guide slit 11 toward the second recessed portion 11*b*. During this sliding movement, the attachment shaft 4 is guided into the second recessed portion 11*b* by a biasing force of the spring 3 as shown in FIG. 4. Accordingly, the movable plate 2 is brought into engagement in a state in which the movable plate 2 has rotated through 90 degrees.

When the movable plate 2 is rotated clockwise from the state of FIG. 2, the attachment shaft 4 is guided into the third recessed portion 11*c* by a biasing force of the spring 3 as shown in FIG. 5. Accordingly, the movable plate 2 is similarly brought into engagement in a state in which the movable plate 2 has rotated through 90 degrees.

Furthermore, when the movable plate 2 is rotated in a return direction to FIG. 2 from the state of FIG. 4 or 5, the attachment shaft 4 is guided into the first recessed portion 11*a* of the guide slit 11 by a biasing force of the spring 3. Accordingly, the movable plate 2 is brought into engagement in a state in which the movable plate 2 has rotated through 90 degrees in the return direction.

As described above, the movable plate 2 can be rotated about the axis pin 10 in the first direction or rotated about the axis pin 10*a* in the second direction in the state in which the hook-shaped portions 20 and 20*a* of the movable plate 2 have engaged with the axis pins 10 and 10*a* of the base plate 1. Furthermore, when the movable plate 2 is rotated about the axis pin 10 through 90 degrees toward the axis pin 10*a* in a state in which the hook-shaped portion 20 has engaged with the axis pin 10 but the hook-shaped portion 20*a* has been disengaged from the axis pin 10*a*, the hook-shaped portion 20*a* is brought into engagement with the axis pin 10*a* and then stops. The movable plate 2 can further be rotated about the axis pin 10*a* in the same direction. Those operations hold true for rotation of the movable plate 2 in a reverse direction. Therefore, the movable plate 2 can achieve a variety of postural changes.

Moreover, a rotational operation of the movable plate 2 relative to the base plate 1 can be performed only with the slide/rotation attachment unit 100. Therefore, when the slide/rotation attachment unit 100 is provided between two units 6 and 7 so that the units 6 and 7 are pivoted (rotated) relative to each other, a special process for the units or a design change of the units is hardly required. Furthermore, in a case where two units 6 and 7 are connected by the slide/rotation attachment unit 100, a special process for the units or a design change of the units is hardly required as described above in addition to the basic components of the base plate 1 and the movable plate 2. Therefore, further structural reduction in thickness can be achieved. Moreover, there are no factors for decreasing the strength of the units in the case where the slide/rotation attachment unit 100 is used to connect the units. Furthermore, no components for a rotation mechanism (e.g., a guide groove) are required to be provided on the units. Accordingly, external exposure of such components can be prevented.

(Electronic Device According to First Embodiment)

Figure 7:
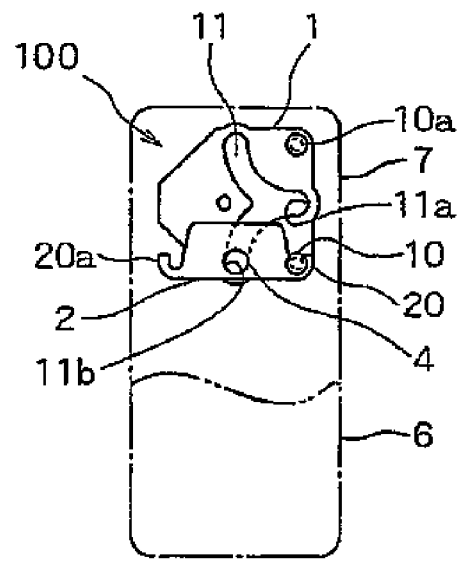
FIG. 7 is a schematic front view of a cellular phone as an electronic device according to a first embodiment in which two units are joined together by using the slide/rotation attachment unit of FIG. 1.
Figure 8:
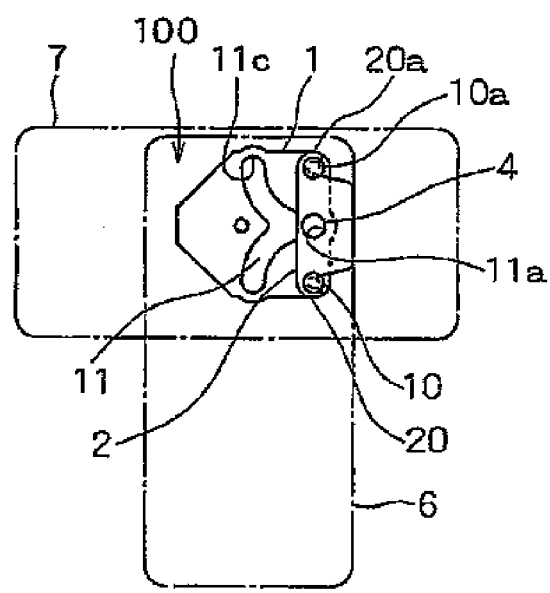
FIG. 8 is a schematic front view of a state in which a second unit of the cellular phone of FIG. 7 has rotated through 90 degrees relative to a first unit in a first direction.
Figure 9:
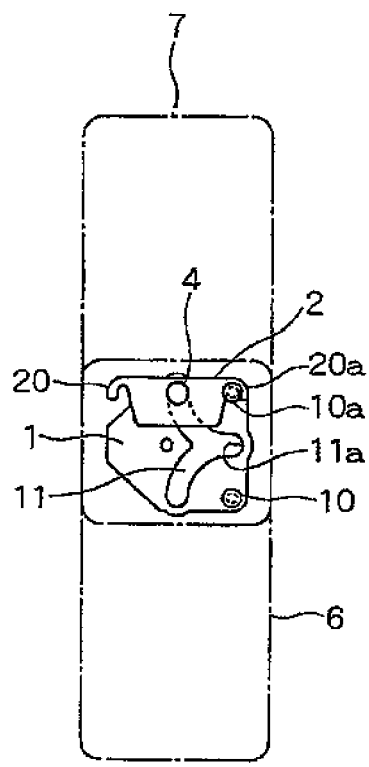
FIG. 9 is a schematic front view of a state in which the second unit of the cellular phone has further rotated through 90 degrees relative to the first unit in the first direction from the state of FIG. 8.

FIG. 7 is a schematic front view of a cellular phone as an electronic device according to a first embodiment in which two units are joined together by using the aforementioned slide/rotation attachment unit 100, FIG. 8 a schematic front view of a state in which a second unit of the cellular phone has rotated through 90 degrees relative to a first unit in a first direction from the state of FIG. 7, and FIG. 9 a schematic front view of a state in which the second unit of the cellular phone has further rotated through 90 degrees relative to the first unit in the first direction from the state of FIG. 8.

For example, it is assumed that a reference state (starting state) is defined as a state in which the first hook-shaped portion 20 of the movable plate 2 has engaged with the first axis pin 10 of the base plate 1 in the slide/rotation attachment unit 100 as shown in FIG. 4 while the second hook-shaped portion 20a has been disengaged from the second axis pin 10a.

The movable plate 2 can be rotated clockwise about the first axis pin 10 through 90 degrees from the reference state of FIG. 4 and can subsequently be rotated clockwise about the second axis pin 10a through 90 degrees. This holds true for a case where the movable plate 2 is rotated counterclockwise through 90 degrees two times when the reference state is defined as the state shown in FIG. 5. The following cellular phone is an electronic device according to a first embodiment configured to use those characteristics.

In FIGS. 7 to 9, a first unit 6, which is vertically oriented, is a base (operation) unit of a cellular phone. The first unit 6 is provided with operation buttons (not shown) and the like on its front side. A rear surface of a second unit 7, which is vertically oriented, is overlaid on the front surface of the first unit 6. The second unit 7 is a movable (display) unit. The second unit 7 is provided with a display screen (not shown) and the like on its front side.

The slide/rotation attachment unit 100 is interposed between upper ends of the first unit 6 and the second unit 7. The first unit 6 is attached to a rear surface of the base plate 1, whereas the second unit 7 is attached to a front surface of the movable plate 2.

Preferably, a periphery of the base plate 1 has such a shape that the base plate 1 cannot be seen from the outside of the base plate 1 when the unit 7 is rotated, the detail of which will be described later. Specifically, the base plate 1 is configured to have a rectangular plane. The base plate 1 has a shape in which a side away from the axis pins 10a and 10 as compared to other sides in the periphery of the rectangular base plate 1 has been cut obliquely.

In the attached state (reference state) of the second unit 7 with respect to the first unit 6, as shown in FIG. 7, the second and first axis pins 10a and 10 of the base plate 1 are located along a right edge of an area in which the units 6 and 7 have been overlaid on each other. The first hook-shaped portion 20 of the movable plate 2 has engaged with the first axis pin 10, and the second hook-shaped portion 20a has been disengaged from the second axis pin 10a.

In this reference state, a compact state is maintained without exposing the operation part of the first unit 6. The display part of the second unit 7 can be used in a vertically-oriented state or a horizontally-oriented state.

When the second unit 7 is rotated clockwise from the reference state of FIG. 7 so that the movable plate 2 rotates about the first axis pin 10 through 90 degrees toward the second axis pin 10a, the second hook-shaped portion 20a is brought into engagement with the second axis pin 10a. At the same time, the attachment shaft 4 is guided into the first recessed portion 11a of the guide slit 11. Therefore, the second unit 7 changes from the posture of FIG. 7 into a horizontally-oriented posture of FIG. 8 and then stops. Thus, the cellular phone forms a roughly T-shape as a whole. When the second unit 7 takes this posture, for example, the cellular phone is suitable to receive television broadcasts or to display websites.

When the second unit 7 is further rotated clockwise from the state of FIG. 8, the first hook-shaped portion 20 is disengaged from the first axis pin 10. The movable plate 2 rotates about the second axis pin 10a. According to this rotation, the attachment shaft 4 is guided into the third recessed portion 11c of the guide slit 11. Therefore, the second unit 7 changes from the horizontally-oriented posture of FIG. 8 into a vertically-oriented posture shown in FIG. 9 and then stops. At that time, a lower edge region of the second unit 7 is overlaid on an upper edge region of the first unit 6, so that the entire cellular phone has the most elongated shape. For example, this state is suitable to use the cellular phone in the same manner as the existing telephones.

According to the slide/rotation attachment unit 100 used in the aforementioned cellular phone, when the second unit 7 is attached to the first unit 6 such that the second unit 7 is rotatable relative to the first unit 6, only slight processing for attachment (e.g., forming small holes in the plates) is required for the units 6 and 7. Thus, a special process or design change is hardly required. Therefore, no fundamental changes are required in metal molds for manufacturing the units 6 and 7. This technique can readily be applied to the existing models.

The movable plate 2 of the slide/rotation attachment unit 100 can achieve not only postural changes with rotation through 90 degrees in one direction relative to the base plate 1 and rotation in a reverse direction for return, but also a variety of postural changes as described above. Therefore, by using the movable plate 2 for coupling an operation unit and a display unit of an electronic device, the display postures of the display unit can be changed in various ways depending upon the selection of the reference posture. Thus, the usability of the electronic device can further be improved.

The slide/rotation attachment unit 100 includes, as fundamental components, the base plate 1 and the movable plate 2 attached to the base plate 1 so that the movable plate 2 is rotatable relative to the base plate 1. When two units are coupled to each other by this slide/rotation attachment unit 100, a special process or design change is hardly required in the units 6 and 7 as described above. Therefore, the slide/rotation attachment unit 100, the cellular phone, and the like can be configured to be structurally thinner. Additionally, when the slide/rotation attachment unit 100 is used to couple units to each other, it does not cause reduction of the strength of those units. Furthermore, no components for a rotation mechanism (e.g., a guide groove) are required to be provided on the units. Accordingly, external exposure of such components can be prevented.

Once the movable plate 2 of the slide/rotation attachment unit 100 is rotated about one of the axis pins 10 in a rotatable direction by hand, the biasing effect, i.e., the snap action of the spring 3 automatically rotates the second unit 7 along with the movable plate 2 without hand operation to complete the rotation until the second unit 7 stops. Therefore, the display postures of the display unit in various electronic devices including cellular phones can smoothly be changed with ease.

The effects of the spring 3 and the associated arrangement of the recessed portions 11a to 11c of the guide slit 11 and the attachment shaft 4, which is slidable along the guide slit 11, prevent backlashes of the movable plate 2 and the unit 7 attached to the movable plate 2 after postural changes of the unit 7. Therefore, stability can be provided in posture and operation. Since the guide slit 11 has been formed into a shape like a Japanese letter "く" in which arcs are combined on both sides of the first recessed portion 11a, movement of the movable plate 2 relative to the base plate 1 (i.e., movement of the second unit 7 relative to the first unit 6) can be made very smooth.

The spring 3 uses a torsion spring. As shown in FIG. 6, the curled portion of the movable arm 30 of the spring 3 is engaged with the attachment shaft 4, and the curled portion of the stationary arm 31 of the spring 3 is attached to the base plate 1. Therefore, the slide/rotation attachment unit 100 can further be made thinner. Since the attachment shaft 4 is hollow (like a pipe), it is convenient to pass lead wires, which are not shown, through the attachment shaft 4 so as to electrically connect the first and second units 6 and 7 to each other.

The base plate 1 has the regulation pieces 14 and 14a formed for regulating movement of the movable plate 2 without inhibiting the hook-shaped portions 20 and 20a from being disengaged from the corresponding axis pins 10 and 10a in the state in which the hook-shaped portions 20 and 20a of the movable plate 2 has engaged with the corresponding axis pins 10 and 10a. Therefore, a device into which the slide/rotation attachment unit 100 has been incorporated can be operated more stably.

(Electronic Device According to Second Embodiment)

Figure 10:
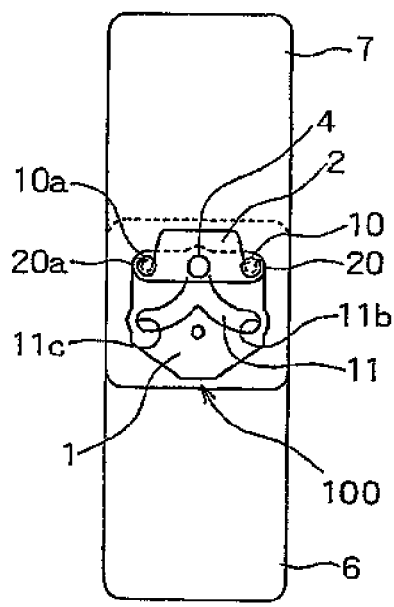
FIG. 10 is a schematic front view of a cellular phone as an electronic device according to a second embodiment in which two units are joined together by using the slide/rotation attachment unit of FIG. 1.
Figure 11:
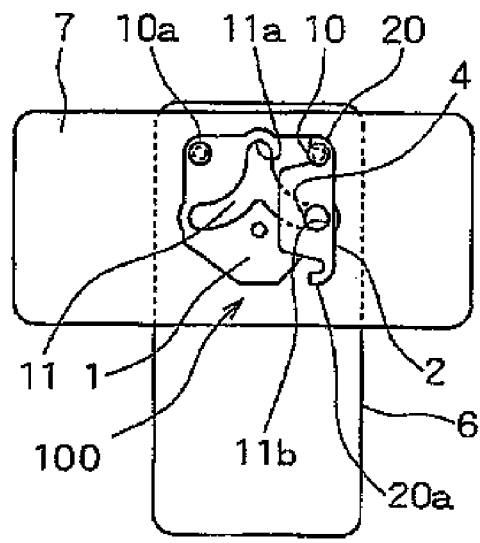
FIG. 11 is a schematic front view of a state in which a second unit of the cellular phone of FIG. 10 has rotated counterclockwise through 90 degrees relative to a first unit.
Figure 12:
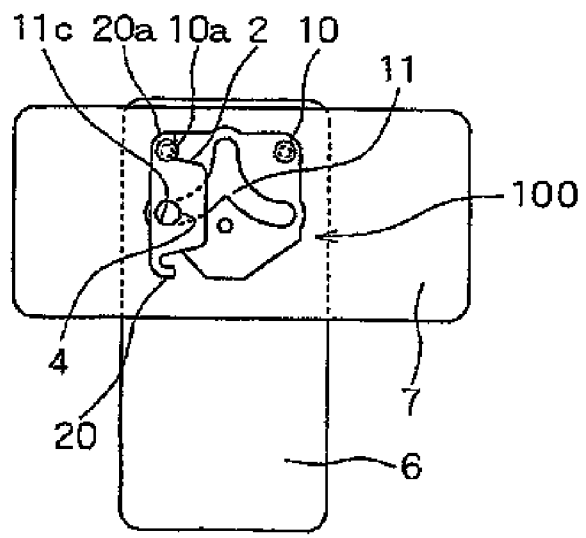
FIG. 12 a schematic front view of a state in which the second unit of the cellular phone of FIG. 10 has rotated clockwise through 90 degrees relative to the first unit.

FIG. 10 is a schematic front view of a slidable cellular phone in which two units are joined together by using the aforementioned slide/rotation attachment unit 100, FIG. 11 a schematic front view of a state in which a second unit of the cellular phone has rotated through 90 degrees relative to a first unit in a first direction from the state of FIG. 10, and FIG. 12 a schematic front view of a state in which the second unit of the cellular phone has rotated through 90 degrees relative to the first unit in a second direction from the state of FIG. 10.

As described above, when the movable plate 2 is rotated counterclockwise from the state of FIG. 2, the movable plate 2 stops in a state in which it has rotated through 90 degrees as shown in FIG. 4. When the movable plate 2 is rotated clockwise from the state of FIG. 2, the movable plate 2 stops in a state in which it has rotated through 90 degrees as shown in FIG. 5. Furthermore, when the movable plate 2 is rotated in a return direction of FIG. 2 from the state of FIG. 4 or 5, the movable plate 2 stops in a state in which it has rotated through 90 degrees in the return direction. The following slidable cellular phone is an electronic device according to a second embodiment configured to use those characteristics.

A first unit 6 is a base (operation) unit of a cellular phone. The first unit 6 is provided with operation buttons (not shown) and the like on its front side. A second unit 7 is a movable (display) unit. The second unit 7 is provided with a display screen (not shown) and the like on its front side. The second unit 7 is attached to the front side of the first unit 6 in an overlaid state by, for example, a known slide mechanism (not shown).

The first unit 6 and the second unit 7 are coupled to each other without interfering with a slide operation of the slide mechanism so that they are rotatable relative to each other via the slide/rotation attachment unit 100 of the above embodiment. When the second unit 7 is overlaid substantially on the entire surface of the front side of the first unit 6 (not shown), a compact state is maintained without exposing the operation part of the first unit 6. The display part of the second unit 7 can be used in a vertically-oriented state or a horizontally-oriented state.

FIG. 10 shows that the second unit 7 has slid upward from the aforementioned state until it stopped in order to use the cellular phone for the original purpose of a telephone. At that time, the slide/rotation attachment unit 100 maintains the same state. In the attached state (reference state) of the second unit 7 with respect to the first unit 6, the first and second axis pins 10 and 10a of the base plate 1 are located along the width direction in an upper edge region of the first unit 6 as shown in FIG. 10. The first and second hook-shaped portions 20 and 20a of the movable plate 2 engage with the first and second axis pins 10 and 10a, respectively.

When the second unit 7 is rotated counterclockwise from the reference state of FIG. 10, the movable plate 2 rotates counterclockwise about the first axis pin 10 so that the second hook-shaped portion 20a is disengaged from the second axis pin 10a. At the same time, the attachment shaft 4 is guided into the second recessed portion 11b of the guide slit 11 (FIG. 11). Therefore, the second unit 7 changes from a vertically-oriented posture of FIG. 10 into a horizontally-oriented posture shown in FIG. 11 and then stops. Thus, the cellular phone forms a roughly T-shape as a whole. When the second unit 7 takes this posture, for example, the cellular phone is suitable to receive television broadcasts or to display websites.

When the second unit 7 is rotated clockwise from the state of FIG. 11, the second unit 7 rotates through 90 degrees and then stops. Thus, the cellular phone is returned to the reference state of FIG. 10. When the second unit 7 is rotated clockwise from the reference state of FIG. 10, the movable plate 2 rotates clockwise about the second axis pin 10a so that the first hook-shaped portion 20 is disengaged from the first axis pin 10. At the same time, the attachment shaft 4 is guided into the third recessed portion 11c of the guide slit 11 (FIG. 12). Therefore, the second unit 7 changes from the vertically-oriented posture of FIG. 10 into a horizontally-oriented posture shown in FIG. 12 and then stops. Thus, the second unit 7 is brought into a reverse state to FIG. 11, and the cellular phone forms a roughly T-shape as a whole. When the second unit 7 takes this posture, for example, the cellular phone is also suitable to receive television broadcasts or to display websites.

The aforementioned cellular phone can change the display posture of the second unit 7 from the vertically-oriented posture of FIG. 10 into the horizontally-oriented posture of FIG. 11 or from the vertically-oriented posture of FIG. 10 into the horizontally-oriented posture of FIG. 12. Thus, the second unit 7 can be rotated either clockwise or counterclockwise from the vertically-oriented state of FIG. 10. Therefore, postural changes can conveniently be made independently of a user's dominant hand or the like.

Other advantages of the electronic device according to the second embodiment are the same as those of the electronic device according to the first embodiment, and the explanation thereof is omitted herein.

(Electronic Device According to Third Embodiment)

Figure 13:
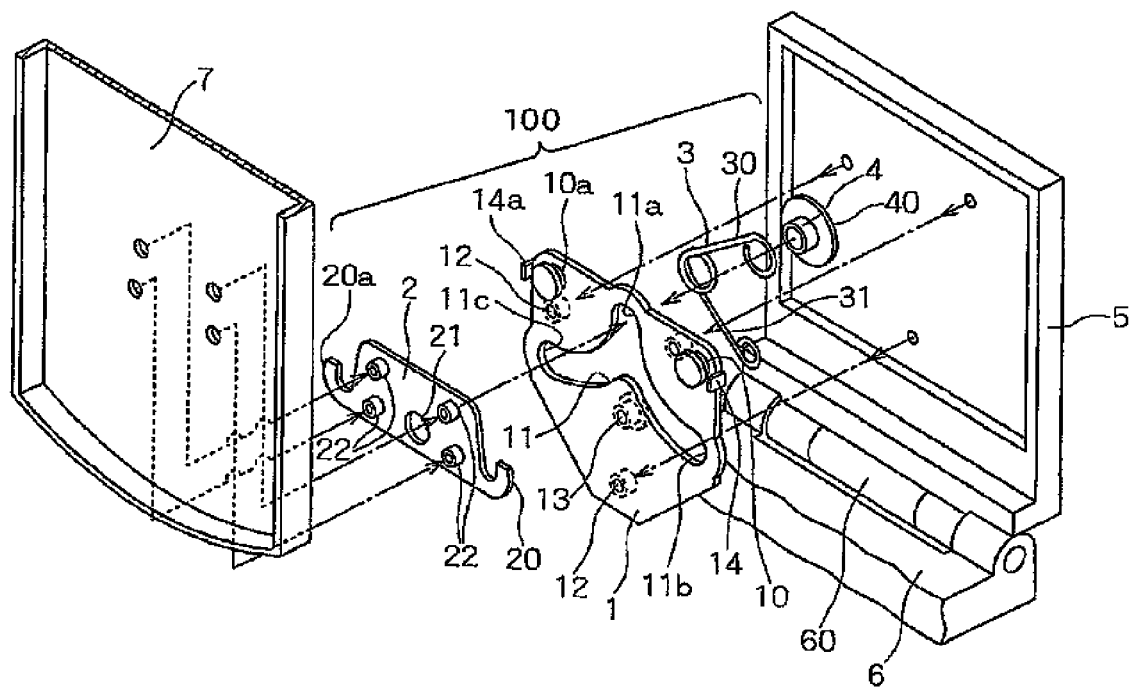
FIG. 13 is a partial exploded perspective view of a foldable cellular phone as an electronic device according to a third embodiment using the slide/rotation attachment unit 100 of FIG. 1.

An electronic device according to a third embodiment is a foldable cellular phone using the aforementioned slide/rotation attachment unit 100. FIG. 13 is a partial exploded perspective view of a cellular phone, FIG. 14 a schematic front view of a state in which a second unit of the cellular phone is opened with respect to a first unit, FIG. 15 a schematic front view of a state in which the second unit has rotated through 90 degrees in a first direction from the state of FIG. 14, and FIG. 16 a schematic front view of a state in which the second unit has rotated through 90 degrees in a second direction from the state of FIG. 14.

In FIG. 13, a holding base 5 is attached to an end of a first unit 6, which has an operation part (not shown) such as operation keys on its front side, via a hinged portion 60. A second unit 7 is attached to a front surface of the holding base 5 via the slide/rotation attachment unit 100 of the aforementioned embodiment so that the second unit 7 is rotatable relative to the holding base 5. The second unit 7 is coupled indirectly to the first unit 6 via the holding base 5 and the hinged portion 60 by the slide/rotation attachment unit 100. If the base plate 1 of the slide/rotation attachment unit 100 is so strong that it arises no problem in strength, the base plate 1 may be coupled to the end of the first unit 6 via the hinged portion 60. In FIG. 13, only part of a bottom case of the second unit 7 is illustrated for the purpose of illustration.

The base plate 1 is attached to the front surface of the holding base 5, using a plurality of bossed nut portions 12 formed on the base plate 1, by small screws, which are not shown. The movable plate 2 is attached to a rear surface of the second unit 7, using plurality of bossed nut portions 22 formed on the movable plate 2 in the same manner, by small screws, which are not shown.

The attached state (reference state) of the slide/rotation attachment unit 100 between the holding base 5 and the second unit 7 is the same as that of the cellular phone as an electronic device according to the second embodiment. Specifically, in the reference state of the second unit 7 with respect to the first unit 6, as shown in FIG. 14, the first and second hook-shaped portions 20 and 20a of the movable plate 2 engage with the first and second axis pins 10 and 10a of the base plate 1, respectively.

Figure 14:
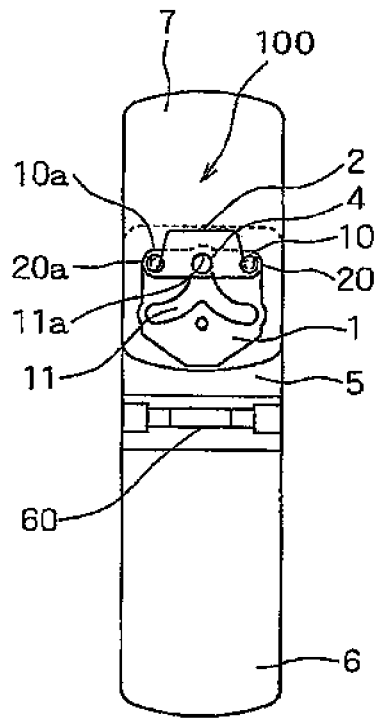
FIG. 14 is a schematic front view of a state in which a second unit of the cellular phone of FIG. 13 is opened with respect to a first unit.

When the second unit 7 is rotated counterclockwise from the reference state of FIG. 14, the movable plate 2 rotates counterclockwise about the first axis pin 10 so that the second hook-shaped portion 20a is disengaged from the second axis pin 10a. At the same time, the attachment shaft 4 is guided into the second recessed portion 11b of the guide slit 11 (FIG. 15).

When the second unit 7 is reversely rotated clockwise from the reference state of FIG. 14, the movable plate 2 rotates counterclockwise about the second axis pin 10a so that the first hook-shaped portion 20 is disengaged from the first axis pin 10. At the same time, the attachment shaft 4 is guided into the third recessed portion 11c of the guide slit 11 (FIG. 16).

In either case, the second unit 7 rotates through 90 degrees and then stops. Thus, the second unit 7 changes from a vertically-oriented posture of FIG. 14 into a horizontally-oriented posture shown in FIG. 15 or 16 and then stops. Thus, the cellular phone forms a roughly T-shape as a whole. When the second unit 7 takes those postures, for example, the cellular phone is suitable to receive television broadcasts or to display websites.

Figure 15:
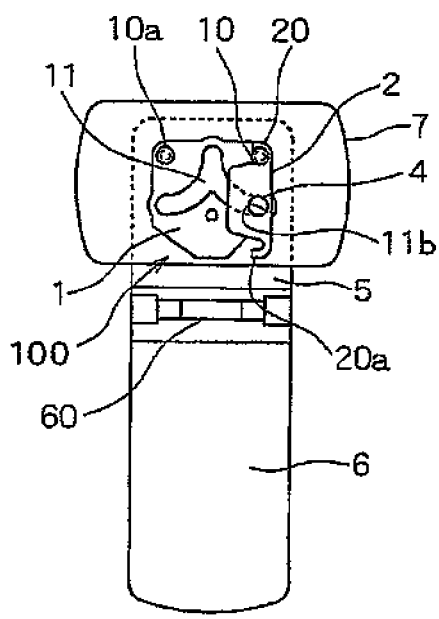
FIG. 15 is a schematic front view of a state in which the second unit of the cellular phone of FIG. 14 has rotated through 90 degrees in a first direction.
Figure 16:
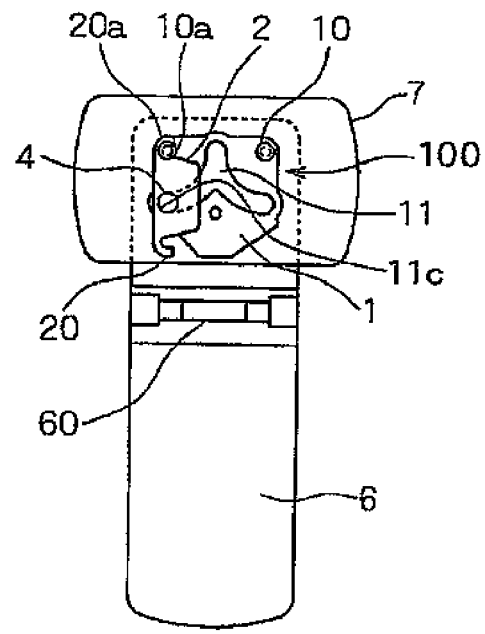
FIG. 16 a schematic front view of a state in which the second unit of the cellular phone of FIG. 14 has rotated through 90 degrees in a second direction.

The foldable cellular phone as an electronic device according to the third embodiment can change the display posture of the second unit 7 from the vertically-oriented posture of FIG. 14 into the horizontally-oriented posture shown in FIG. 15 or 16 substantially in the same manner as the cellular phone as an electronic device according to the second embodiment. Thus, the second unit 7 can be rotated either clockwise or counterclockwise from the vertically-oriented state of FIG. 14. Therefore, postural changes can be made independently of a user's dominant hand or the like.

Other advantages of the cellular phone as an electronic device according to the third embodiment are the same as those of the cellular as an electronic device according to the first embodiment, and the explanation thereof is omitted herein.

(Electronic Device According to Fourth Embodiment)

Figure 17:
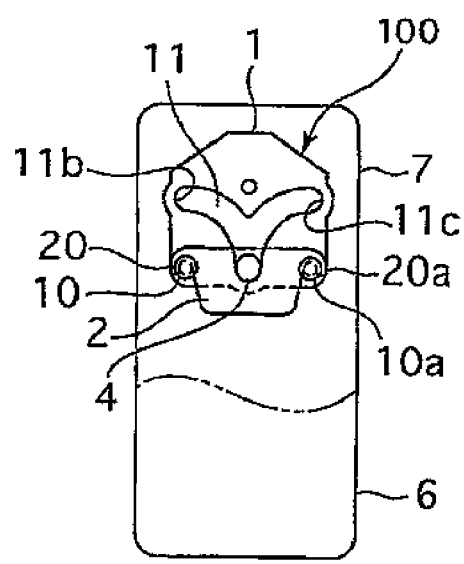
FIG. 17 is a schematic front view of a cellular phone as an electronic device according to a fourth embodiment in which two units are joined together by using the slide/rotation attachment unit according to the embodiment of FIG. 1.
Figure 18:
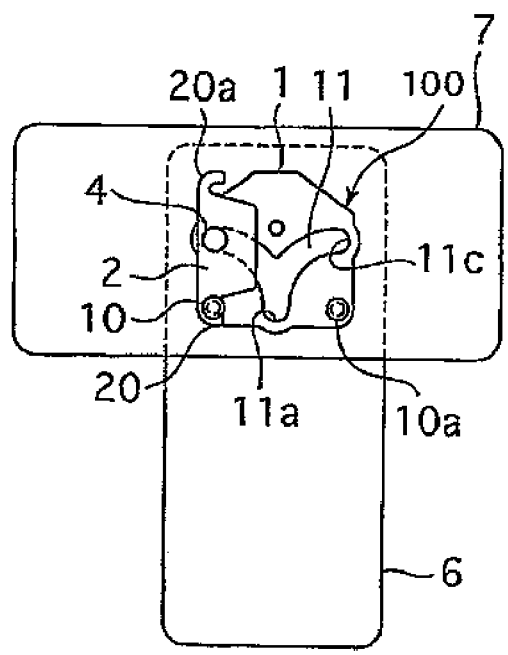
FIG. 18 is a schematic front view of a state in which a second unit of the cellular phone of FIG. 17 has rotated counterclockwise through 90 degrees relative to a first unit.
Figure 19:
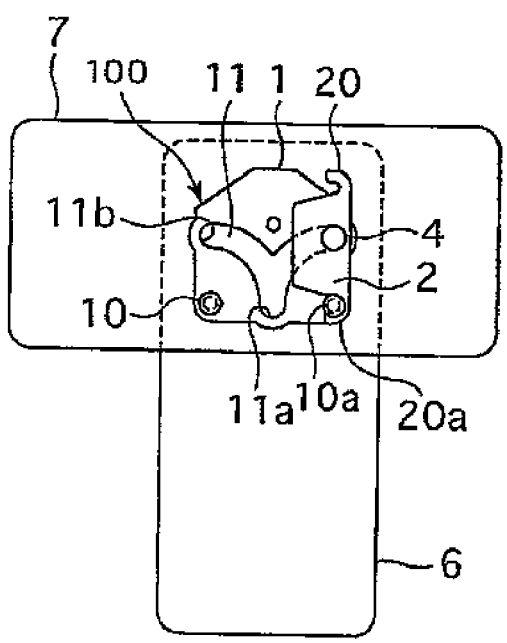
FIG. 19 is a schematic front view of a state in which the second unit of the cellular phone of FIG. 17 has rotated clockwise through 90 degrees relative to the first unit.
Figure 20:
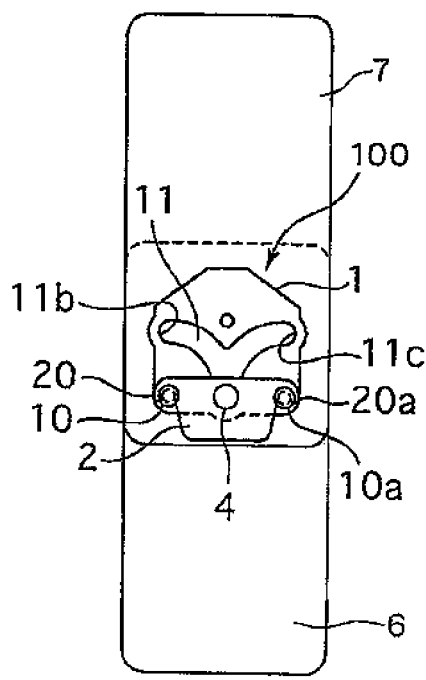
FIG. 20 is a schematic front view of a state in which the second unit of the cellular phone of FIG. 17 has slid upward relative to the first unit.
Figure 21:
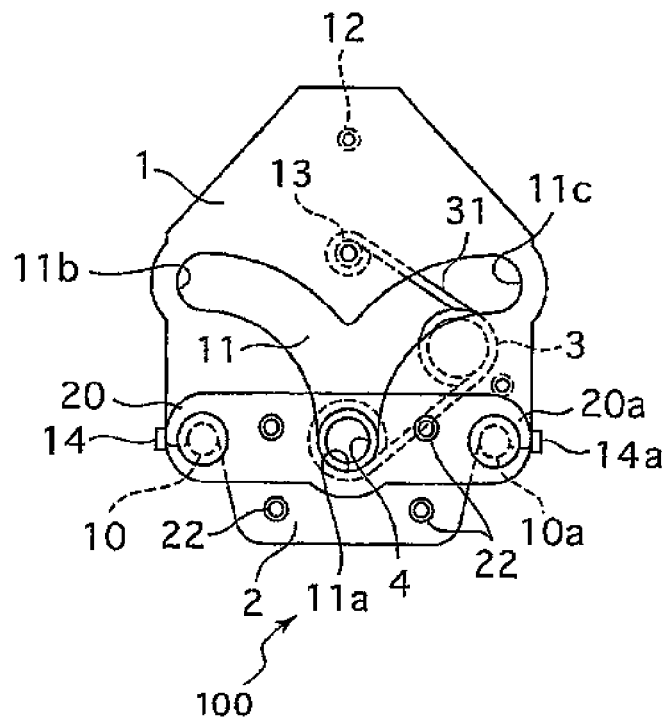
FIG. 21 is a schematic front view showing one of attachment directions of the slide/rotation attachment unit of FIG. 1, which corresponds to a case where the cellular phone takes a posture of FIG. 17 or 20.

An electronic device according to a fourth embodiment is a slidable cellular phone in which the slide/rotation attachment unit 100 used in the electronic device according to the second embodiment is attached in a state in which the slide/rotation attachment unit 100 has been rotated through 180 degrees. FIG. 17 is a schematic front view of a slidable cellular phone in which two units are joined together with use of the slide/rotation attachment unit 100, which shows a state before a second unit slides with respect to a first unit, FIG. 18 a schematic front view of a state in which the second unit of the cellular phone has rotated through 90 degrees in a first direction (counterclockwise) from the state of FIG. 17 relative to the first unit, FIG. 19 a schematic front view of a state in which the second unit of the cellular phone has rotated through 90 degrees in a second direction (clockwise) from the state of FIG. 17 relative to the first unit, and FIG. 20 a schematic front view of a state in which the second unit of the cellular phone has slid relative to the first unit. FIG. 21 shows a state of the slide/rotation attachment unit 100 when the cellular phone takes a posture of FIG. 17 or 20, FIG. 22 shows a state of the slide/rotation attachment unit 100 when the cellular phone takes a posture of FIG. 18, and FIG. 23 shows a state of the slide/rotation attachment unit 100 when the cellular phone takes a posture of FIG. 19.

Figure 22:
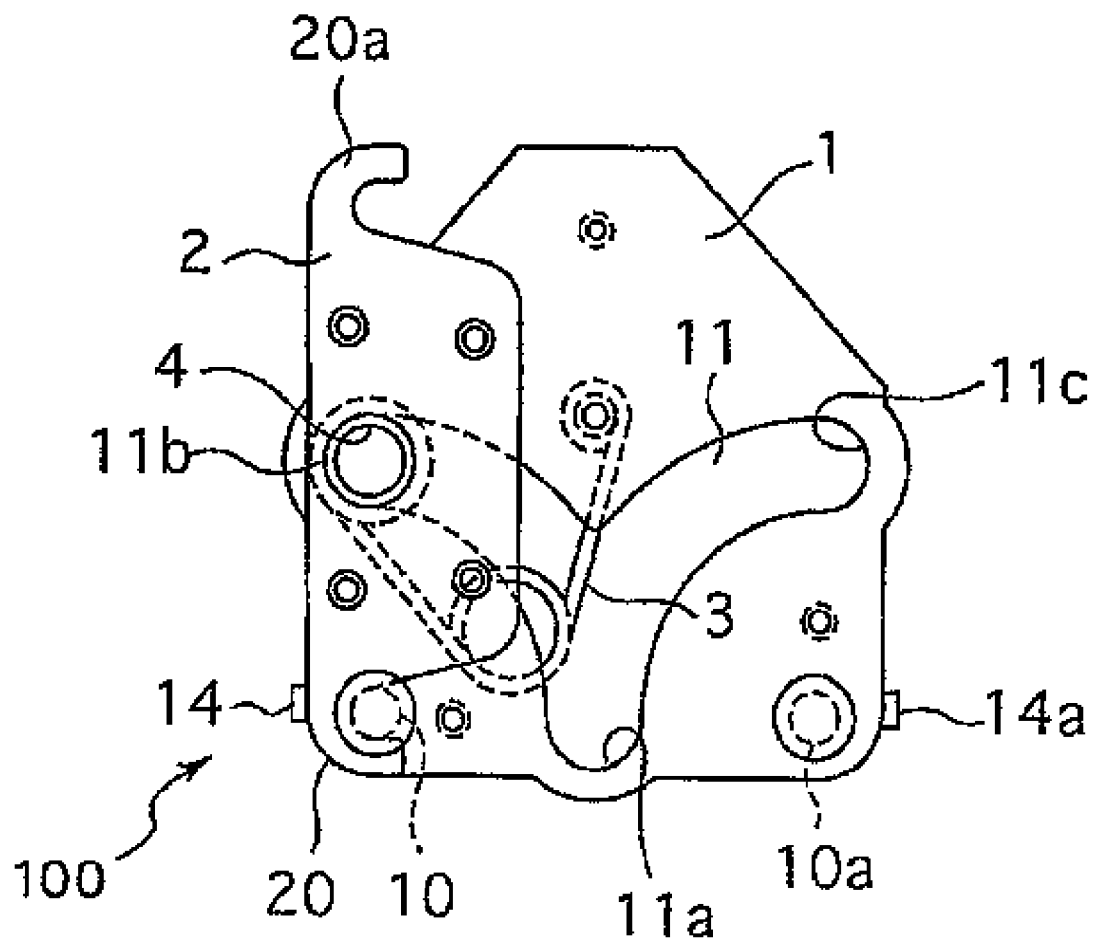
FIG. 22 is a front view of a state in which a movable plate of the slide/rotation attachment unit has rotated counterclockwise through 90 degrees from the state of FIG. 21.
Figure 23:
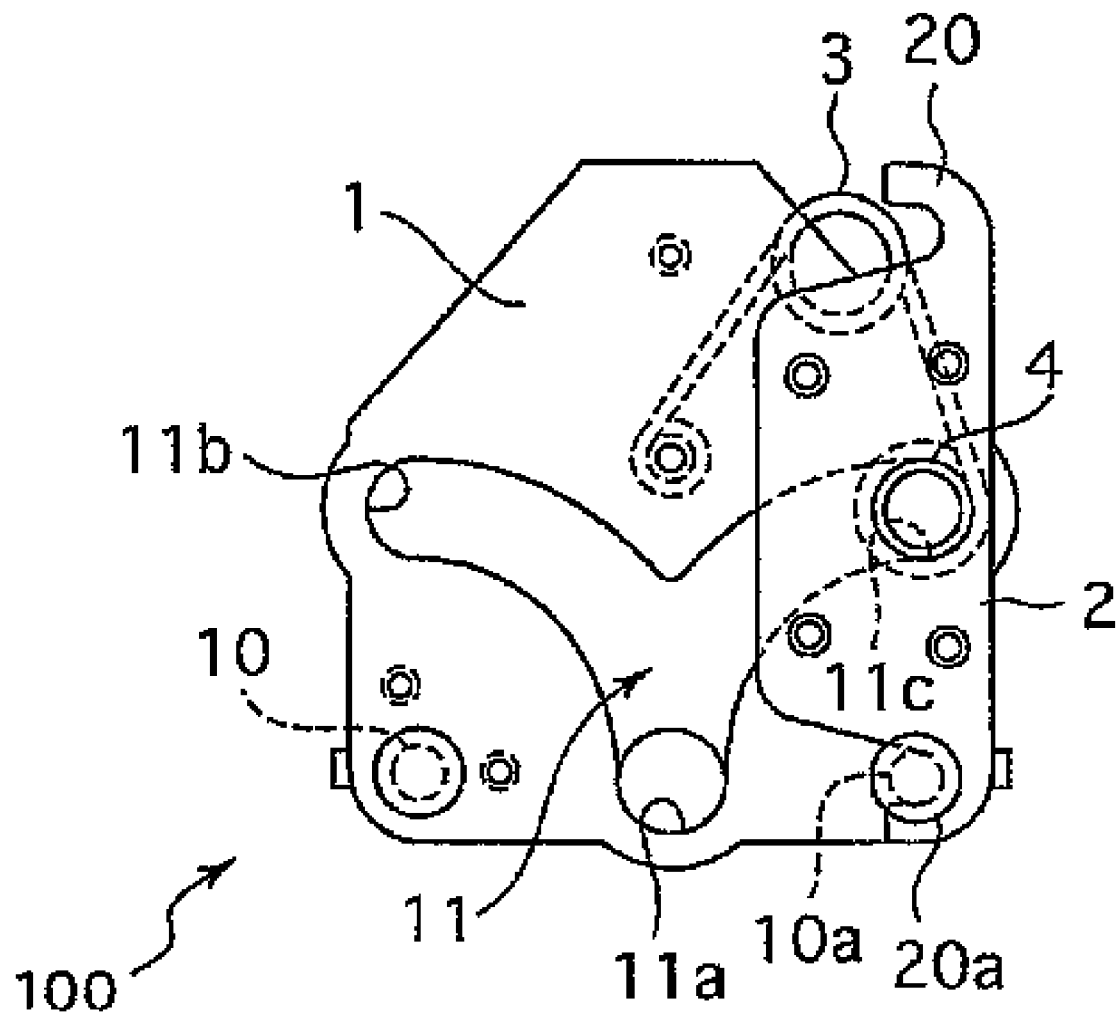
FIG. 23 is a front view of a state in which the movable plate of the slide/rotation attachment unit has rotated clockwise through 90 degrees from the state of FIG. 21.

When the movable plate 2 is rotated counterclockwise from the state of FIG. 21, the movable plate 2 stops in a state in which the movable plate 2 has rotated through 90 degrees as shown in FIG. 22. When the movable plate 2 is rotated clockwise from the state of FIG. 21, the movable plate 2 stops in a state in which the movable plate 2 has rotated through 90 degrees as shown in FIG. 23. Furthermore, when the movable plate 2 is rotated in a return direction to FIG. 21 from a state of FIG. 22 or 23, the movable plate 2 stops in a state in which the movable plate 2 has rotated through 90 degrees in the return direction.

A first unit 6 is a base (operation) unit of a cellular phone. The first unit 6 is provided with operation buttons (not shown) on its front side. A second unit 7 is a movable (display) unit. The second unit 7 is provided with a display screen (not shown) and the like on its front side. The first unit 6 and the second unit 7 are coupled to each other without interfering with a slide operation of the slide mechanism so that they are rotatable relative to each other via the slide/rotation attachment unit 100 of the above embodiment.

FIG. 17 shows a state in which the second unit 7 is overlaid substantially on the entire surface of a front side of the first unit 6. A compact state is maintained without exposing the operation part of the first unit 6. The display part of the second unit 7 can be used in a vertically-oriented state or a horizontally-oriented state. FIG. 20 shows a state in which the second unit 7 has slid upward from the state of FIG. 17 for using the cellular phone as a slidable cellular phone until it stopped. At that time, the slide/rotation attachment unit 100 maintains the same state (the state of FIG. 21).

In the attached state (reference state) of the second unit 7 with respect to the first unit 6 as shown in FIG. 17, the first and second axis pins 10 and 10a of the base plate 1 are located along the width direction in a region slightly lower than an upper edge of the first unit 6. The first and second hook-shaped portions 20 and 20a of the movable plate 2 engage with the first and second axis pins 10 and 10a, respectively.

When the second unit 7 is rotated counterclockwise from the state of FIG. 17, the movable plate 2 rotates counterclockwise about the first axis pin 10 so that the second hook-shaped portion 20a is disengaged from the second axis pin 10a. At the same time, the attachment shaft 4 is guided into the second recessed portion 11b of the guide slit 11 (FIG. 18). Therefore, the second unit 7 changes from a vertically-oriented posture of FIG. 17 into a horizontally-oriented posture shown in FIG. 18 and then stops. Thus, the cellular phone forms a roughly T-shape as a whole. When the second unit 7 takes this posture, for example, the cellular phone is suitable to receive television broadcasts or to display websites.

When the second unit 7 is rotated counterclockwise from the state of FIG. 18, the second unit 7 rotates through 90 degrees and then stops, so that the second unit 7 returns to the state of FIG. 17. When the second unit 7 is rotated clockwise from the state of FIG. 17, the movable plate 2 rotates clockwise about the second axis pin 10a so that the first hook-shaped portion 20 is disengaged from the first axis pin 10. At the same time, the attachment shaft 4 is guided into the third recessed portion 11c of the guide slit 11 (FIG. 19). Therefore, the second unit 7 changes from the vertically-oriented posture of FIG. 17 into the horizontally-oriented posture shown in FIG. 18 and then stops. Thus, the second unit 7 is brought into a reverse state to FIG. 18, and the cellular phone forms a roughly T-shape as a whole. When the second unit 7 takes this posture, for example, the cellular phone is suitable to receive television broadcasts or to display websites.

Furthermore, when the second unit 7 slides upward from the state of FIG. 17 until it stops, the second unit 7 is brought into a state of FIG. 20, in which the cellular phone is used as a slidable cellular phone while the display part of the second unit 7 takes a vertically-oriented posture.

The cellular phone can change the display posture of the second unit 7 from the vertically-oriented posture of FIG. 17 into the horizontally-oriented posture of FIG. 18 or from the vertically-oriented posture of FIG. 17 into the horizontally-oriented posture of FIG. 19. Furthermore, the cellular phone can be brought into a slide state of FIG. 20 with maintaining the vertically-oriented posture of FIG. 17. Thus, the second unit 7 can be rotated either clockwise or counterclockwise from the vertically-oriented state of FIG. 17. Additionally, the second unit 7 can be slid upward with maintaining the vertically-oriented posture. Therefore, postural changes can be made independently of a user's dominant hand or the like.

Other advantages of the cellular phone as an electronic device according to the fourth embodiment are the same as those of the cellular phone as an electronic device according to the first embodiment, and the explanation thereof is omitted herein.

The cellular phone of the fourth embodiment may have no slide mechanism. In such a case, the cellular phone can change into three postures in the same manner as shown in FIGS. 17, 18, and 19.

While the invention has been particularly shown and described with reference to exemplary embodiments thereof, the invention is not limited to those embodiments. It will be understood by those of ordinary skill in the art that various changes in form and details may be made therein without departing from the spirit and scope of the present invention as defined by the claims.

This application is based upon and claims the benefit of priority from Japanese patent application No. 2008-093851, filed on Mar. 31, 2008, the disclosure of which is incorporated herein in its entirety by reference, and Japanese patent application No. 2008-193221, filed on Jul. 28, 2008, the disclosure of which is incorporated herein in its entirety by reference.

INDUSTRIAL APPLICABILITY

The present invention is applicable to any device used with two units being slid or rotated relative to each other.

The invention claimed is:

1. A slide/rotation attachment unit including:
a base plate with first and second axis pins being spaced from each other at a predetermined distance; and
a movable plate with first and second hook-shaped portions that can engage with the first and second axis pins, respectively,
wherein the base plate and the movable plate are joined together so that the base plate and the movable plate are rotatable relative to each other,
wherein, when the movable plate rotates in one direction, the first hook-shaped portion is brought into engagement with the first axis pin and the second hook-shaped portion is disengaged from the second axis pin, and
wherein, when the movable plate rotates in another direction, the second hook-shaped portion is brought into engagement with the second axis pin and the first hook-shaped portion is disengaged from the first axis pin.

2. The slide/rotation attachment unit according to claim 1, further including an attachment shaft for joining the base plate and the movable plate together, wherein the base plate is provided with a guide slit having such a shape that an arc with a center at the first axis pin and an arc with a center at the second axis pin meet at an intermediate position between the first and second axis pins, the movable plate includes an attachment portion provided at an intermediate position between the first and second hook-shaped portions, and the attachment shaft is fixed to the attachment portion and is movable within the guide slit.

3. The slide/rotation attachment unit according to claim 2, wherein the attachment shaft is in a form of a pipe.

4. The slide/rotation attachment unit according to claim 2, wherein the intermediate position between the first and second axis pins is a substantial midpoint of a line connecting the first and second axis pins, and the intermediate position between the first and second hook-shaped portions is a substantial midpoint of a line connecting the first and second hook-shaped portions.

5. The slide/rotation attachment unit according to claim 2, wherein the guide slit includes:
a first recessed portion into which the attachment shaft is guided by spring bias when the first and second axis pins engage with the first and second hook-shaped portions, respectively,
a second recessed portion into which the attachment shaft is guided by spring bias when the movable plate rotates through 90 degrees in one direction from the state in which the first and second axis pins have engaged with the first and second hook-shaped portions, respectively, and
a third recessed portion into which the attachment shaft is guided by spring bias when the movable plate rotates through 90 degrees in another direction from the state in which the first and second axis pins have engaged with the first and second hook-shaped portions, respectively.

6. The slide/rotation attachment unit according to claim 5, wherein the spring for spring bias comprises a torsion spring, one arm of the spring is attached to the base plate, and another arm of the spring is attached to the attachment shaft.

7. The slide/rotation attachment unit according to claim 1, wherein the base plate includes a regulation piece formed for regulating movement of the movable plate without inhibiting the hook-shaped portions from being disengaged from the corresponding axis pins in the state in which the first and second hook-shaped portions have engaged with the first and second axis pins, respectively.

8. The slide/rotation attachment unit according to claim 7, wherein the movable plate includes a protruded portion provided at an intermediate position between the first and second axis pins, and, in order to prevent the hook-shaped portions of the movable plate from coming off, the regulation piece is configured to be longer than a movable length of a joint portion of the base plate and the movable plate when the movable plate is moved toward the protruded portion in the state in which the first and second hook-shaped portions have engaged with the first and second axis pins, respectively, until the joint portion is brought into contact with the protruded portion.

9. An electronic device, wherein the slide/rotation attachment unit according to claim 1 is provided between a first unit as an operation unit and a second unit as a display unit in a state in which a rear surface of the second unit is overlaid on a front surface of the first unit, the base plate is attached to the first unit, the movable plate is attached to the second unit, the first hook-shaped portion of the movable plate engages with the first axis pin in the attached state while the second hook-shaped portion is disengaged from the second axis pin, the second hook-shaped portion is brought into engagement with the second axis pin and the second unit is changed from a vertically-oriented posture to a horizontally-oriented posture when the movable plate rotates about the first axis pin toward the second axis pin through 90 degrees, and the second unit is changed into a vertically-oriented posture in which part of the second unit is overlaid on part of the first unit along a longitudinal direction when the movable plate further rotates about the second axis pin in the same direction through 90 degrees.

10. The electronic device according to claim 9, wherein a periphery of the base plate has such a shape that the base plate cannot be seen from an outside of the base plate at the time of rotation of the second unit.

11. The electronic device according to claim 10, wherein the base plate is configured to have a rectangular plane having a shape in which a side away from the axis pins as compared to other sides in the periphery of the rectangular base plate has been cut obliquely.

12. A slidable electronic device in which a first unit as an operation unit is slidable relative to a second unit as a display unit in a state in which a rear surface of the second unit is overlaid on a front surface of the first unit, wherein the slide/rotation attachment unit according to claim 1 is provided between the first unit and the second unit, the base plate is attached to the first unit, the movable plate is attached to the second unit, the first and second hook-shaped portions of the movable plate engage with the first and second axis pins of the base plate, respectively, in the attached state, the second unit is changed from a vertically-oriented posture to a horizontally-oriented posture when the movable plate rotates about the first axis pin in one direction through 90 degrees, and the second unit is changed into a reversed horizontally-oriented posture when the movable plate rotates about the second axis pin in another direction through 90 degrees.

13. A foldable electronic device in which a first unit as an operation unit is coupled to a second unit as a display unit in a foldable state, wherein the first unit includes a holding base coupled via a foldable hinged portion, the second unit is coupled to the first unit via the holding base, the slide/rotation attachment unit according to claim 1 is provided between the first unit and the second unit, the base plate is attached to the holding base, the movable plate is attached to the second unit, the first and second hook-shaped portions of the movable plate engage with the first and second axis pins of the base plate, respectively, in the attached state, the second unit is changed from a vertically-oriented posture to a horizontally-oriented posture when the movable plate rotates about the first axis pin in one direction through 90 degrees, and the second unit is changed into a reversed horizontally-oriented posture when the movable plate rotates about the second axis pin in another direction through 90 degrees.

* * * * *